United States Patent
Hu (10) Patent No.: US 7,822,976 B2
(45) Date of Patent: Oct. 26, 2010

(54) NETWORK DATA SECURITY SYSTEM AND PROTECTING METHOD THEREOF

(75) Inventor: Ta-Hsiung Hu, Taipei (TW)

(73) Assignee: Kinghood Technology Co., Ltd., Taipei (TW)

( * ) Notice: Subject to any disclaimer, the term of this patent is extended or adjusted under 35 U.S.C. 154(b) by 901 days.

(21) Appl. No.: 11/715,424

(22) Filed: Mar. 8, 2007

(65) Prior Publication Data

US 2008/0222412 A1 Sep. 11, 2008

(51) Int. Cl.
*H04L 9/00* (2006.01)
(52) U.S. Cl. ..................... 713/158
(58) Field of Classification Search ........... 713/156, 713/157, 158, 155; 726/6, 10
See application file for complete search history.

(56) References Cited

U.S. PATENT DOCUMENTS

| | | |
|---|---|---|
| 6,052,785 A | 4/2000 | Lin et al. |
| 2001/0044894 A1* | 11/2001 | Saito et al. ............... 713/156 |
| 2003/0140230 A1* | 7/2003 | de Jong et al. ............... 713/182 |
| 2005/0187873 A1* | 8/2005 | Labrou et al. ............... 705/40 |

OTHER PUBLICATIONS

Scheibelhofer "Using OpenCard in Combination with the Java Cryptography Architecture for Digital Signing".
Office Action dated Mar. 29, 2010 issued in corresponding Taiwanese Application No. 09920199100.

* cited by examiner

*Primary Examiner*—Ellen Tran
(74) *Attorney, Agent, or Firm*—Bacon & Thomas, PLLC.

(57) ABSTRACT

The invention presents a network data security system and a protecting method applied in network data transmission. Meanwhile the network data security system includes a client, an authentication dispatching server and a number of distributed servers. The authentication dispatching server includes a first determination device and a user certificate generator; and each distributed server includes a second determination device, a second user certificate generator and a processor. The method for protecting data of the present invention introduces the authentication dispatching server providing the client with a user certificate in a valid period of time and further introduces an updated certificate mechanism for preventing the user certificate from being stolen and further preventing network data from being let out.

13 Claims, 5 Drawing Sheets

NETWORK DATA SECURITY SYSTEM AND PROTECTING METHOD THEREOF

FIELD OF THE INVENTION

The present invention relates generally to a security system and a protecting method thereof; and, more specifically, to a network data security system and a protecting method applied in network data transmission.

BACKGROUND OF THE INVENTION

Nowadays, people commonly communicate via digital data. The commercial affairs, public affairs or private affairs are preceded by means of e-mail anyhow. However, some important and confidential data, which are stored in a storage memory without protection, could be stolen away by unauthorized users easily, wherein the important and confidential data could not be protected in motion.

For preventing from the above situations, there are a lot of mechanisms disclosed according to data encryption standards, wherein the data encryption is the process of protecting data from unauthorized access, use, disclosure, destruction, modification, or disruption in motion of transmission or storage. Usually, the encryption process transforms the comprehensible data into the incomprehensible data according to a specific computer algorithm that rearrange the data bits in digital signals; and the decryption process, which is the reverse of the encryption process, transforms the incomprehensible data back to the original comprehensible data according to a reverse algorithm. In practice, data is transformed into the incomprehensible data, and then the incomprehensible data are transmitted via the network (such as Internet or Intranet), or stored in the memory. Furthermore, when the incomprehensible data are received or researched by the user with access authorization, the user executes the decryption process to decrypt the encrypted data for utilizing the original data.

Following the development of electronic and communication technologies, the electronic transactions are able to provide facilities of saving/drawing of bank account, going shopping, paying tax, and so on, and thereby providing convenience of life and further saving time. However, there could be a latent problem of network security for improving the convenience. As we know, the communication of Internet and Intranet could be executed according to several different standards, such as TCP/IP, UDP, FTP, RPC, RIC, HTTP, SMTP, IEEE802.3, and so on. Congenitally, those several communication protocols don't introduce any encryption schemes into the network. Therefore, the unauthorized users could easily get communicating data in the public network and then rearrange data via applicable combinations, thereby achieving the purpose of stealing data. Obviously, when the important data are transmitted via the network without introducing the complete encryption schemes or defining related secure communication protocols in several levels of network, the public network won't provide transmitted data with secure and powerful protections.

Moreover, wireless mobile communication has become a mainstream of modern communication services. Comparatively, it is not easy to setup substantive constructions of wire phone communication, leased line communication or optical fiber communication. Therefore, wireless mobile communication should take them over. Meanwhile, IEEE (Institute of Electrical and Electronic Engineers) defines IEEE 802.11 communication protocol for Wireless Local Area Networks (WLAN). For instance, SSL (Secure Sockets Layer), originated by Netscape Development Corporation (disclosed in U.S. Pat. No. 5,657,390), is a commonly used protocol. The SSL protocol is designed to establish a secure connection by means of RSA Public Key cryptography between a client and a server communicating over an insecure channel. Presently, the SSL has been introduced into the great part of network servers and browsers. Furthermore, Secure Electronic Transaction (SET) is a system for ensuring the security of financial transactions on the electronic commerce. It is supported initially by VISA®, MasterCard®, IBM®, Microsoft®, Netscape®, GTE®, VeriSign®, SAIC®, Terisa® and others. With SET, a user is given an electronic wallet (digital certificate) and a transaction is conducted and verified using a combination of digital certificates and digital signatures via RSA Public Key cryptography among the purchaser, a merchant, and the purchaser's bank in a way that ensures privacy and confidentiality. Those security protocols commonly used in Wireless Local Area Networks (WLAN) are derived from a predecessor of wireless modem; wherein the communication is limited in end-to-end; and the wireless transmission medium is introduced by means of radio frequency (RF). Thus, the data of system could be eavesdropped, stolen, or destroyed easily by illegal users. Therefore, the security of network transmission should be attached great importance to.

Accordingly, the prior electronic commerce fails to provide a complete security system; and the wireless communication is limited in end-to-end according to the prior art. Therefore, in practice, the prior art could not provide a network communication system with entire security. Hence, it needs to provide a network security system and a protecting method applied in network data transmission, wherein electronic commerce and business transaction are dealt anytime in the construction, to rectify those drawbacks of the prior art and solve the above problems.

SUMMARY OF THE INVENTION

This paragraph extracts and compiles some features of the present invention; other features will be disclosed in the following paragraphs. It is intended to cover various modifications and similar arrangements included within the spirit and scope of the appended claims, and this paragraph also is considered to refer.

Accordingly, the prior art is limited by the above problems. It is an object of the present invention to provide a network security system and a protecting method of a network data, wherein the security of network data could be ensured completely even though the login data of user is lost or stolen.

In accordance with an aspect of the present invention, the network security system includes a client; an authentication dispatching server connected with the client via a network, the authentication dispatching server including a first determination device for determining whether an identification data entered from the client is correct; and a user certificate generator for generating a user certificate to the client at a first time while the identification data entered from the client is determined to be correct, wherein the user certificate has a predetermined valid period of time; and a number of distributed servers connected to the client and the authentication dispatching server via the network for receiving a request from the client at a second time, each of the distributed servers including a second determination device connected to the client and the authentication dispatching server via the network for determining whether the user certificate of the client is correct and whether an interval between the first time and the second time is in the predetermined valid period of time; and a processor for executing the request while the second determination device determines the user certificate of the client to be correct and the interval to be in the predetermined valid period of time.

Preferably, the second determination device is connected with the authentication dispatching server for double-checking whether the user certificate of the client is correct.

Preferably, each distributed servers further comprises an updated certificate generator for generating an updated certificate to the authentication dispatching server and generating a certificate expiration notice of the user certificate to the client while the interval exceeds the predetermined valid period of time, wherein the updated certificate has a predetermined updated valid period of time.

Preferably, the authentication dispatching server commands the client to enter an additional identification data while the authentication dispatching server receives the identification data from the client.

Preferably, the additional identification data is transmitted from the authentication dispatching server by means of short message service of the user's own mobile phone which has been registered in the system.

Preferably, the additional identification data is transmitted from the authentication dispatching server by means of electronic mail which has been registered in the system.

Preferably, the identification data includes a user name and a user password.

Preferably, the additional identification data is randomly generated by the system each time when a user login.

Preferably, the distributed servers include one or more application program servers, one or more communication servers, one or more download servers, one or more database servers, and one or more mail servers.

Preferably, the user certificate includes a key and a digital signature.

Preferably, the authentication dispatching server and the distributed servers form a distributed transaction processing system.

Preferably, the network may be Internet or Intranet.

It is another object of the present invention to provide a method for protecting data, including the steps of: a) inputting at least an identification data; b) determining whether the identification data is correct; c) generating a user certificate with a predetermined valid period of time at a first time while the identification data is correct; d) issuing a request with the user certificate at a second time; e) determining whether the user certificate is correct and whether a first interval between the first time and the second time exceeds the predetermined valid period of time; and f) executing the request while the user certificate is correct and the first interval is in the predetermined valid period of time.

Preferably, the method for protecting data further includes the steps of: g) issuing an additional request with the user certificate at a third time; h) determining whether a second interval between the first time and the third time exceeds the predetermined valid period of time; i) generating an updated certificate and a certificate expiration notice while the user certificate is correct and the second interval between the first time and the third time exceeds the predetermined valid period of time, wherein the updated certificate has a predetermined updated valid period of time; j) replacing said user certificate with said updated certificate; k) entering the user certificate after receiving the certificate expiration notice; l) determining whether the user certificate is correct; m) transmitting the updated certificate with the predetermined updated valid period of time at a fourth time while the user certificate is correct; n) issuing another request with the updated certificate at a fifth time; o) determining whether the updated certificate is correct and whether a third interval between the fourth time and the fifth time exceeds the predetermined updated valid period of time; and p) executing the another request while the updated certificate is correct and the third interval is in the predetermined updated valid period of time.

Preferably, the identification data includes a user name and a user password.

Preferably, the user certificate includes a key and a digital signature.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention discloses a network data security system and a protecting method thereof, and the objects and advantages of the present invention will become more readily apparent to those ordinarily skilled in the art after reviewing the following detailed description. The present invention needs not be limited to the following embodiment.

Figure 1:
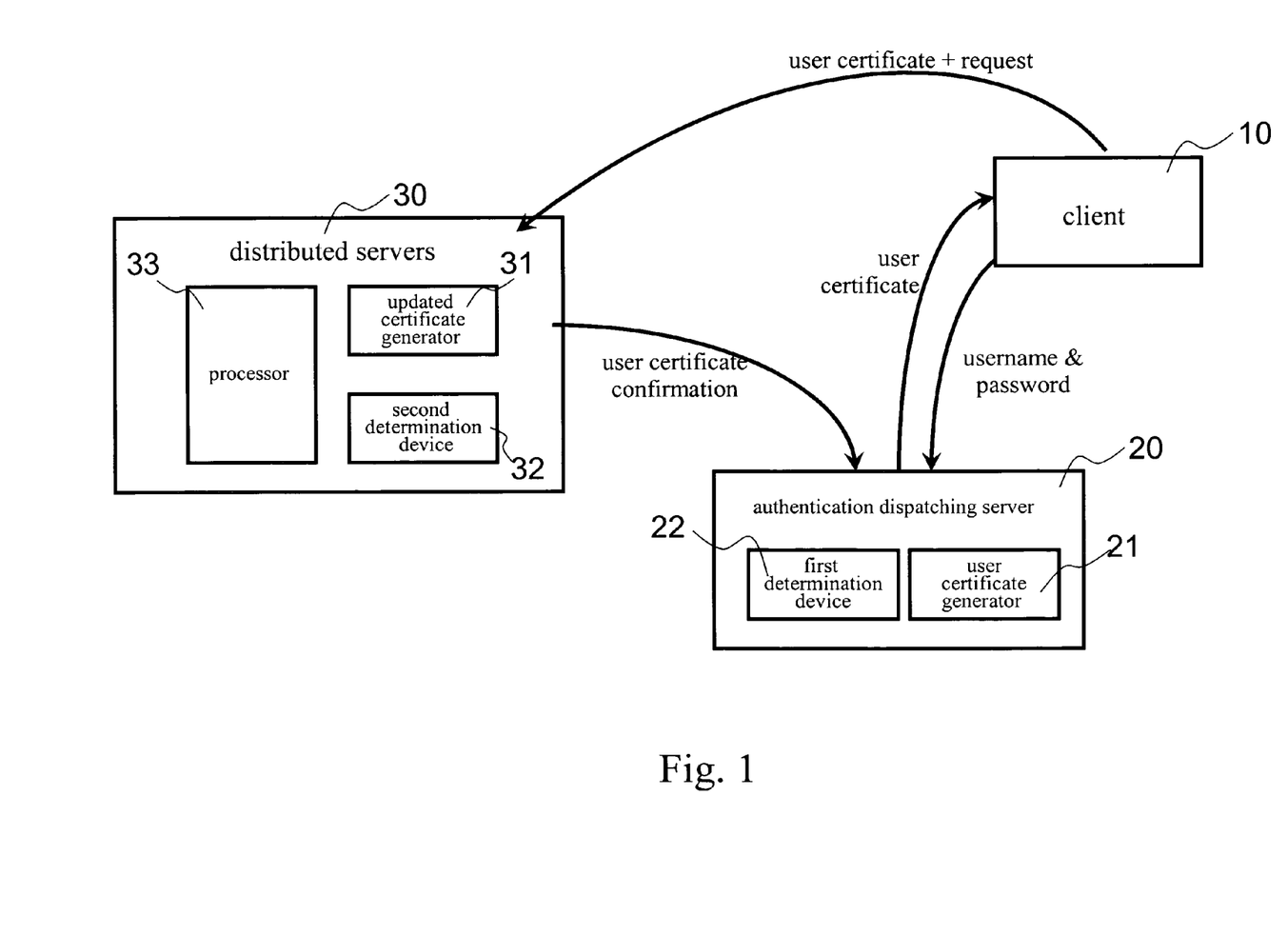
FIG. 1 illustrates a network data security system according to the present invention.

Please refer to FIG. 1. It illustrates a preferred embodiment of a network data security system according to the present invention. The network data security system includes a client 10, an authentication dispatching server 20 and a number of distributed servers 30. Usually, the distributed servers 30 could be one or more application program servers, one or more communication servers, one or more download servers, one or more database servers, and one or more mail servers. In the present invention, the distributed servers 30 represent any combination of those different servers. Certainly, the network data security system could include unique server merely. Furthermore, each distributed server 30 includes a second determination device 32, a processor 33, and an updated certificate generator 31; and the authentication dispatching server 20 includes a first determination device 22 and a user certificate generator 21. The above-described devices would be expatiated in the follow-up descriptions.

Figure 3A:
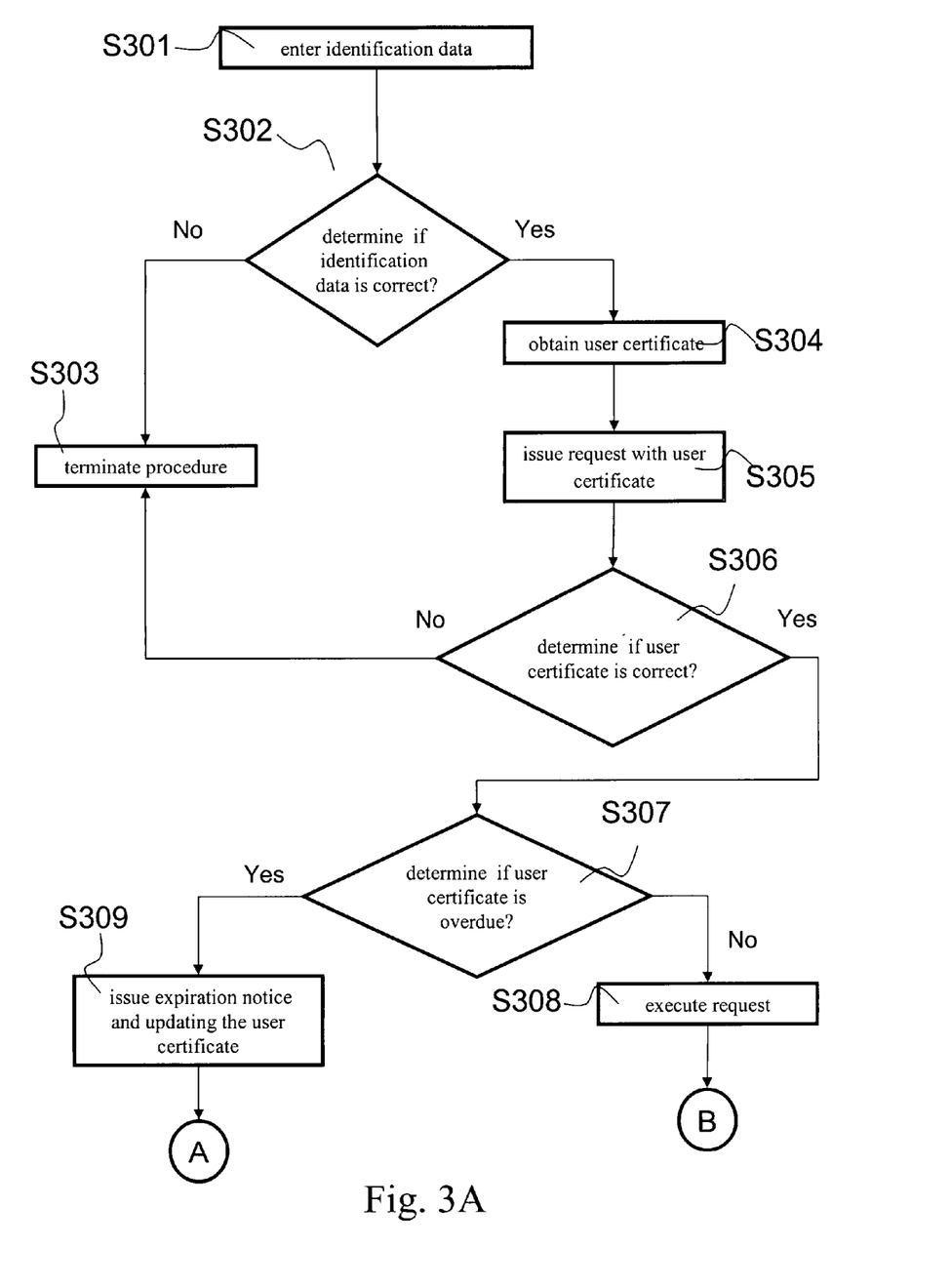
FIGS. 3A-3C illustrates a flow chart of a method for protecting data according to the present invention.
Figure 3B:
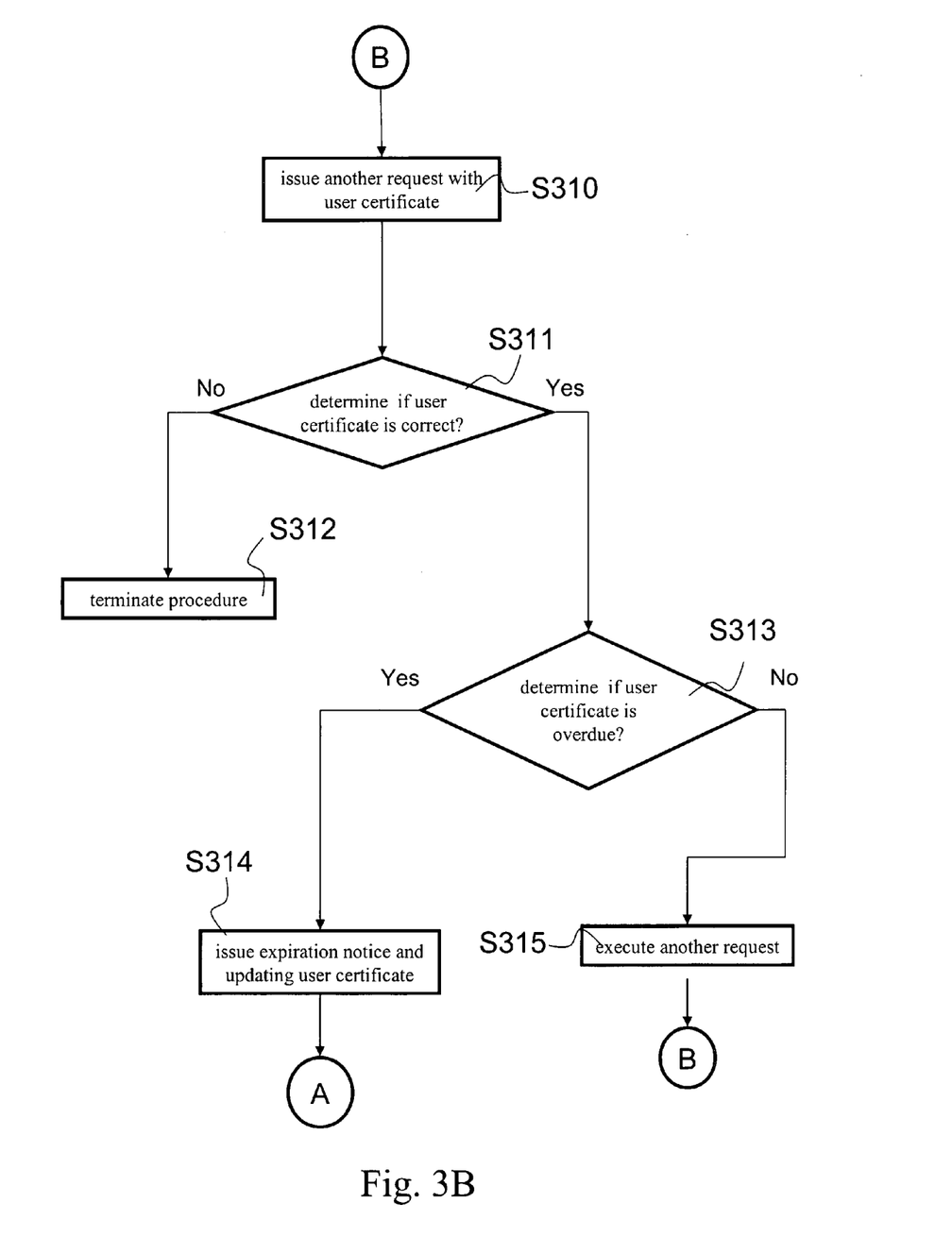
Figure 3C:
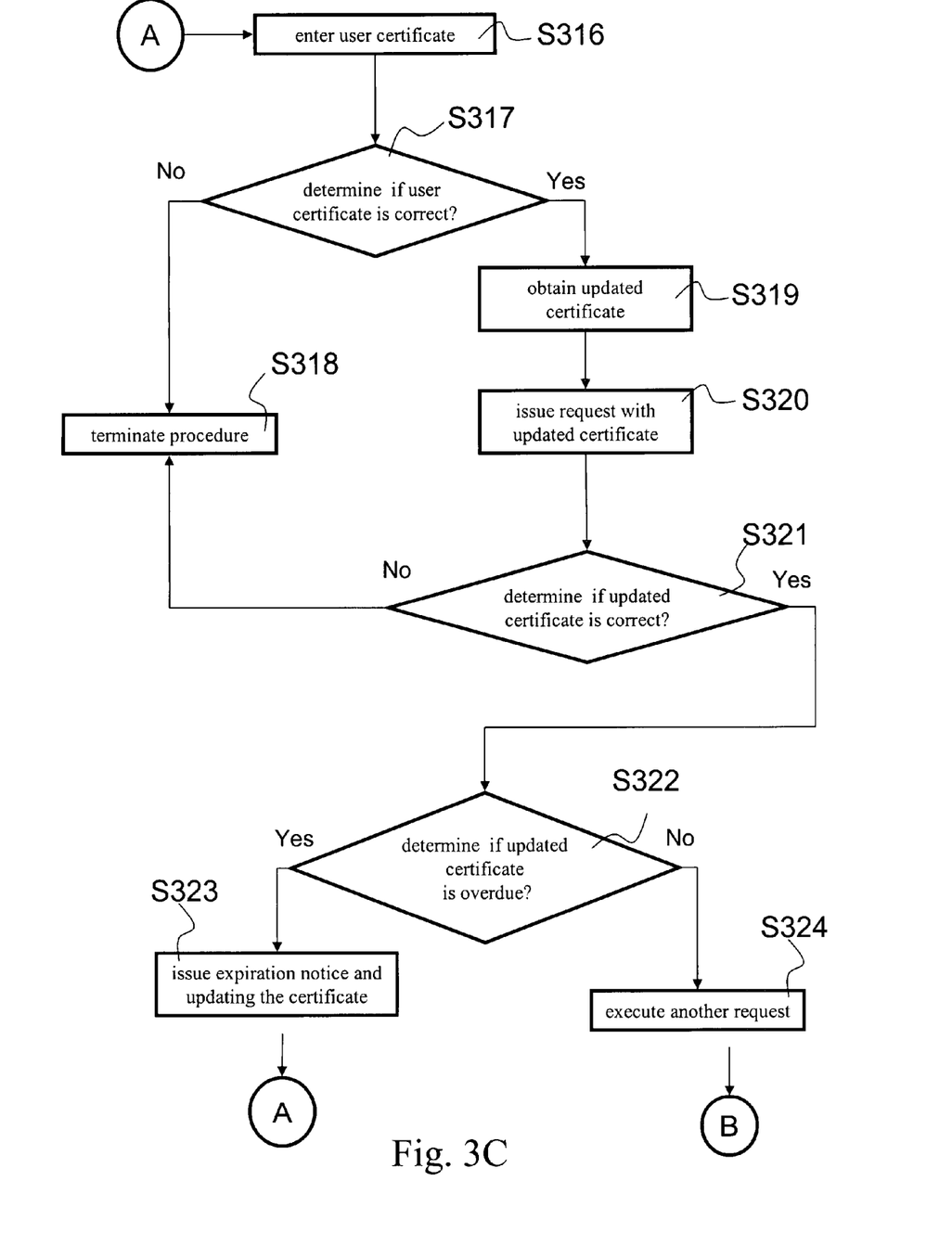

FIGS. 3A-3C further illustrates a flow chart of a method for protecting data according to the present invention. Firstly, referring to FIG. 3A, a user of client 10 enters a username and a password to the authentication dispatching server 20 for authenticating, as shown in step S301. Then, the username and the password of the user of client 10 is determined by a first determination device 22 of the authentication dispatching server 20, as shown in step S302, and the first determination device 22 is connected to the client 10 and the distributed servers 30.

When the first determination device 22 of the authentication dispatching server 20 determined the username and the password to be correct, the user certificate generator 21 of the authentication dispatching server 20 generates a user certificate to the user of client 10, as shown in step S304, wherein a predetermined valid period of time is encrypted into the user certificate via the user certificate generator 21 while generating the user certificate. Certainly, the predetermined valid period of time could be defined by the user certificate generator 21 for preventing the user certificate from being stolen and further preventing network data from being let out. When the username and the password are not correct, the authentication dispatching server 20 will forbid the following steps, as shown in step S303.

After the user of client 10 receives the user certificate from the authentication dispatching server 20, the user of client 10 will be able to issue a request (for example: download, access, communication, and so on.) with the user certificate to the distributed servers 30, as shown in step S305. When the distributed servers 30 receive the request from the user of client 10, the distributed servers 30 then executes the following process according to the request. For example, the user of client 10 issues a download request and the download request with the user certificate will be dispatched to a download server of the distributed servers 30. Then, the download request with the user certificate is determined by the second determination device 32 to check if the user certificate of the request and the user certificate provided by the authentication dispatching server 20 to the client 10 are identical, as shown in step S306. If the user certificate of the request is not correct, the request won't be executed and the running procedure is back to step S303.

If the second determination device 32 determines that the user certificate of the request is correct, the second determination device 32 will further determine whether the interval between the first time of generating the user certificate by the user certificate generator 21 and the second time of issuing the download request by the client 10 exceeds the predetermined valid period of time, as shown in step S307. If the second determination device 32 determines that the interval doesn't exceed the predetermined valid period of time, the download server will execute the request issued by the user of client 10, as shown in step S308. On the contrary, when the interval exceeds the predetermined valid period of time, the updated certificate generator 31 will issue a certificate expiration notice of the user certificate to the user of client 10 and ask the user of client 10 to update the user certificate; and at the same time, the updated certificate generator 31 will generate an updated certificate to the authentication dispatching server 20, as shown in step S309.

The above chapters and sections describe a situation of issuing one request from the user of client 10 merely. However, if the user of client 10 issues more than one request, the user certificate could be stolen or infringed by other illegal users after the user of client 10 obtains the user certificate from the authentication dispatching server 20. Therefore, the present invention further introduces a step of commanding the user of client 10 to obtain an updated certificate in a specific period of time for preventing the user certificate from being stolen or infringed.

Following the above step S308 and further referring to FIG. 3B, the user of client 10 could issue another additional request, as shown in step S310. For example, the user of client 10 further issues an access request, as shown in step S310. When the distributed servers 30 receive the access request from the user of client 10, the access request with the user certificate is dispatched to a database server of the distributed servers 30 for executing the following process according the request. Then, the access request with the user certificate is determined by the second determination device 32 of the database server to check if the user certificate of the access request and the user certificate provided by the authentication dispatching server 20 to the client 10 are identical, as shown in step S311. If the user certificate of the access request is not correct, the access request won't be executed, as shown in step S312.

If the second determination device 32 determines that the user certificate of the request is correct, the second determination device 32 will further determine whether an interval between the first time of generating the user certificate by the user certificate generator 21 and the third time of issuing the access request by the client 10 exceeds the predetermined valid period of time, as shown in step S313.

If the second determination device 32 determines that the interval doesn't exceed the predetermined valid period of time, the database server will execute the access request issued by the user of client 10, as shown in step S315. On the contrary, if the interval exceeds the predetermined valid period of time, the updated certificate generator 31 of the database server will issue a certificate expiration notice of the user certificate to the user of client 10 and ask the user of client 10 to update the original user certificate; and at the same time, the updated certificate generator 31 will generate an updated certificate to the authentication dispatching server 20, as shown in step S314. Moreover, a predetermined updated valid period of time is encrypted into the updated certificate via the updated certificate generator 31 while the updated certificate is generated. Accordingly, the predetermined updated valid period of time could be defined by the authentication dispatching server 20 for preventing the updated certificate from being stolen and further preventing network data from being let out.

Figure 2:
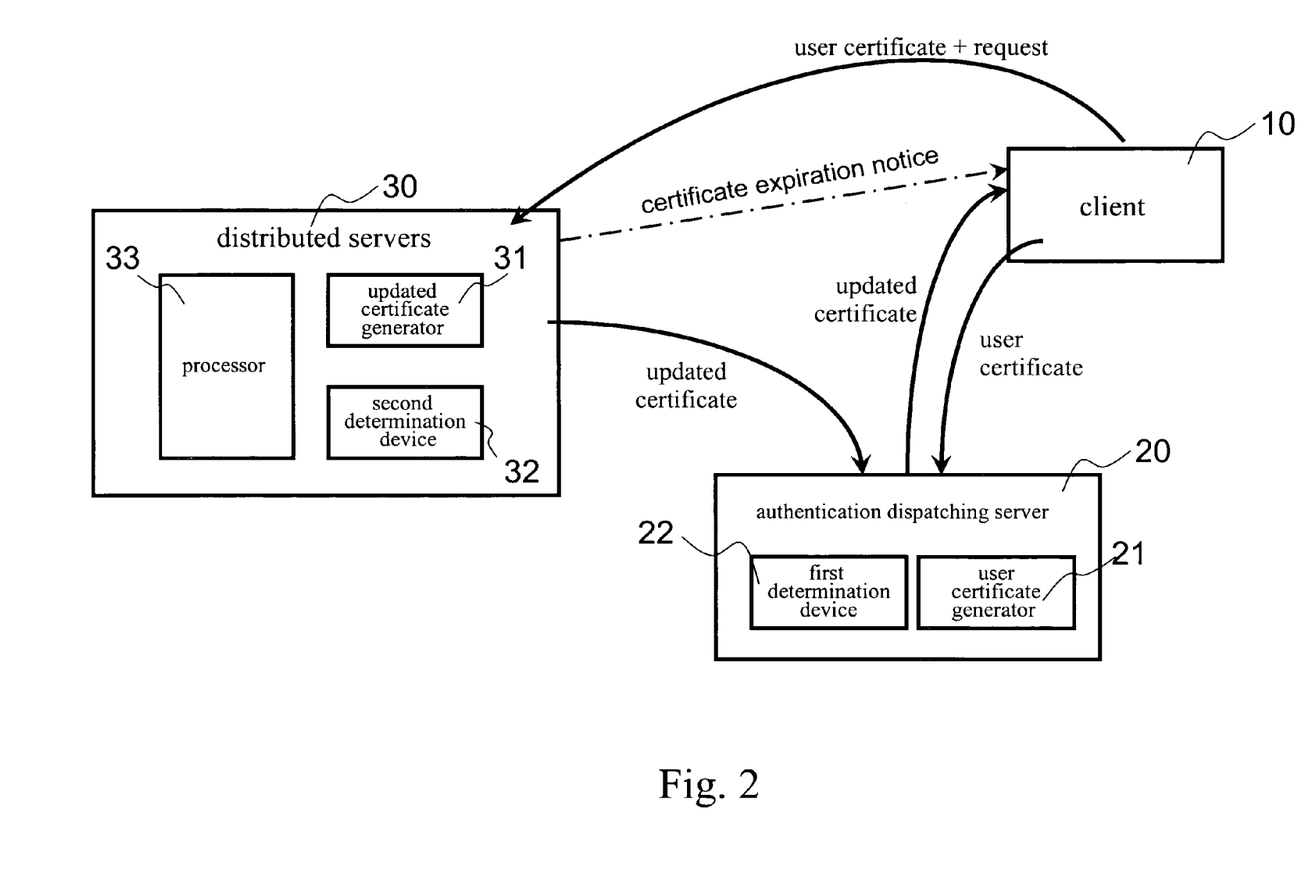
FIG. 2 illustrates a network data security system with an updated certificate mechanism according to the present invention.

Finally, referring to FIG. 2 and FIG. 3C, wherein the running procedure is following step S309. After the user of client 10 receives the expiration data of the user certificate from the updated certificate generator 31, the user of client 10 should update the original user certificate before issuing any other new additional request.

Meanwhile, the user of client 10 commands the authentication dispatching server 20 for obtaining the updated certificate from the updated certificate generator 31 by means of providing the original user certificate instead of re-entering the username and the password again, as shown in step S316. Certainly, the authentication dispatching server 20 will further check whether the user certificate provided by the user client 10 is correct. If the user certificate is not correct, the running procedure will be terminated, as shown in step S318, wherein the updated certificate won't be transmitted to the user of client 10. On the contrary, if the updated certificate is correct, the updated certificate will be transmitted to the user of client 10, as shown in step S319.

After the user of client 10 receives the updated certificate from the authentication dispatching server 20, the user of client 10 will be able to issue additional requests, for example, an access request with the updated certificate to the distributed servers 30, as shown in step S320. When the database server of the distributed servers 30 receive the access request from the user of client 10, the second determination device 32 will determine whether the updated certificate from the user of client 10 and the updated certificate generated from updated certificate generator 31 are identical, as shown in step S321. Additionally, the database server won't execute a further checking with the authentication dispatching server 20 if the updated certificate is generated from the same database server.

If the updated certificate of the access request is not correct, the request won't be executed and the running procedure is back to step S318. If the second determination device 32 determines that the user certificate of the request is correct, the second determination device 32 will further determine whether an interval between the issuing time of the updated certificate from the authentication dispatching server 20 and the issuing time of the access request by the client 10 exceeds the predetermined updated valid period of time, as shown in step S322.

If the second determination device 32 determines that the interval doesn't exceed the predetermined updated valid period of time, the database server will execute the access request issued by the user of client 10, as shown in step S324. On the contrary, if the interval exceeds the predetermined updated valid period of time, the updated certificate generator 31 of the database server will issue another expiration data of the updated certificate to the user of client 10 and ask the user of client 10 to update the original authentication; and at the same time, the updated certificate generator 31 will generate another updated certificate to the authentication dispatching server 20, as shown in step S323.

For enhancing the security of the network data, when the authentication dispatching server 20 receives the username and the password from the user of client 10, the authentication dispatching server could ask the user of client 10 to enter the additional identification data transmitted from the authentication dispatching server by means of short message service of mobile phone or electronic mail.

In conclusion, the present invention provides a network data security system and a method for protecting data applied in network data transmission, which introduces the authentication dispatching server providing the client with a user certificate in a valid period of time, further introduces an updated certificate mechanism for preventing the user certificate from being stolen and further preventing network data from being let out, and can rectify those drawbacks of the prior art and solve the above problems. Meanwhile the prior art fail to disclose that. Accordingly, the present invention possesses many outstanding characteristics, effectively improves upon the drawbacks associated with the prior art in practice and application, produces practical and reliable products, bears novelty, and adds to economical utility value. Therefore, the present invention exhibits a great industrial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A network data security system, comprising:
   a client;
   an authentication dispatching server connected with said client via a network, said authentication dispatching server including:
   a first determination device for determining whether an identification data entered from said client is correct; and
   a user certificate generator for generating a user certificate to said client at a first time while said identification data entered from said client is correct, said user certificate including a predetermined valid period of time; and
   a plurality of distributed servers connected to said client and said authentication dispatching server via said network for receiving a request from said client at a second time, each of said distributed servers including:
   a second determination device connected to said client and said authentication dispatching server via said network for double-checking with said authentication dispatching server whether said user certificate of said client is correct and determining whether an interval between said first time and said second time is in said predetermined valid period of time;
   a processor for executing said request while said second determination device determines said user certificate of said client to be correct and said interval to be in said predetermined valid period of time; and
   an updated certificate generator for generating an updated certificate to said authentication dispatching server and generating a certificate expiration notice of said user certificate to said client while said interval exceeds said predetermined valid period of time, wherein said updated certificate has a predetermined updated valid period of time.

2. The network data security system according to claim 1, wherein said authentication dispatching server commands said client to enter an additional identification data while said authentication dispatching server receives said identification data from said client.

3. The network data security system according to claim 2, wherein said additional identification data is randomly generated by said network data security system each time when a user login.

4. The network data security system according to claim 3, wherein said additional identification data is transmitted from said authentication dispatching server by means of short message service of mobile phone.

5. The network data security system according to claim 3, wherein said additional identification data is transmitted from said authentication dispatching server by means of electronic mail.

6. The network data security system according to claim 1, wherein said identification data includes a username and a password.

7. The network data security system according to claim 1, wherein said plurality of distributed servers include one or more application program servers, one or more communication servers, one or more download servers, one or more database servers, and one or more mail servers.

8. The network data security system according to claim 1, wherein said user certificate comprises a key and a digital signature.

9. The network data security system according to claim 1, wherein said authentication dispatching server and said plurality of distributed servers form a distributed transaction processing system.

10. The network data security system according to claim 1, wherein said network comprises Internet and Intranet.

11. A method for protecting data, comprising the steps of;
   a) entering at least an identification data;
   b) determining whether said identification data is correct;
   c) generating a user certificate with a predetermined valid period of time at a first time while said identification data is correct;
   d) issuing a request with said user certificate at a second time;
   e) determining whether said user certificate is correct and whether a first interval between said first time and said second time exceeds said predetermined valid period of time;
   f) executing said request while said user certificate is correct and said first interval is in said predetermined valid period of time;

g) issuing an additional request with said user certificate at a third time;

h) determining whether a second interval between said first time and said third time exceeds said predetermined valid period of time;

i) generating an updated certificate and a certificate expiration notice while said user certificate is correct and said second interval between said first time and said third time exceeds said predetermined valid period of time, wherein said updated certificate has a predetermined updated valid period of time;

j) replacing said user certificate with said updated certificate;

k) entering said user certificate after receiving said certificate expiration notice;

l) determining whether said user certificate is correct;

m) transmitting said updated certificate with said predetermined updated valid period of time at a fourth time while said user certificate is correct;

n) issuing another request with said updated certificate at a fifth time;

o) determining whether said updated certificate is correct and whether a third interval between said fourth time and said fifth time exceeds said predetermined updated valid period of time; and p) executing said another request while said updated certificate is correct and said third interval is in said predetermined updated valid period of time.

12. The method according to claim 11, wherein said identification data includes a user name and a user password.

13. The method according to claim 11, wherein said user certificate comprises a key and a digital signature.

* * * * *